US009286436B2

(12) United States Patent
Zhu et al.

(10) Patent No.: US 9,286,436 B2
(45) Date of Patent: Mar. 15, 2016

(54) IDENTIFICATION AND MANAGEMENT OF REDUNDANCY WITHIN GEOMETRIC RELATIONSHIPS

(71) Applicant: Siemens Product Lifecycle Management Software Inc., Plano, TX (US)

(72) Inventors: Yanong Zhu, Cambridge (GB); Douglas Joseph King, Peterborough (GB); Howard Charles Duncan Mattson, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 531 days.

(21) Appl. No.: 13/627,133

(22) Filed: Sep. 26, 2012

(65) Prior Publication Data
US 2014/0012548 A1    Jan. 9, 2014

Related U.S. Application Data

(60) Provisional application No. 61/668,794, filed on Jul. 6, 2012.

(51) Int. Cl.
*G06F 17/50*    (2006.01)
*G06T 19/20*    (2011.01)

(52) U.S. Cl.
CPC ............ *G06F 17/5086* (2013.01); *G06F 17/50* (2013.01); *G06T 19/20* (2013.01); *G06F 2217/06* (2013.01); *G06T 2219/2021* (2013.01)

(58) Field of Classification Search
CPC .. G06F 17/5086; G06F 17/20; G06F 2217/06; G06T 19/20; G06T 17/50; G06T 2219/2021
USPC ......................................................... 703/1, 2
See application file for complete search history.

(56) References Cited

U.S. PATENT DOCUMENTS

2003/0208285 A1* 11/2003 Regli et al. ...................... 700/30
2009/0271156 A1* 10/2009 Kageura ............................ 703/1

OTHER PUBLICATIONS

Notification of Transmittal of the International Search Report and the Written Opinion of the International Searching Authority, or the Declaration dated Sep. 5, 2013 in connection with International Patent Application No. PCT/US2013/049002.

(Continued)

*Primary Examiner* — Dwin M Craig

(57) ABSTRACT

Methods for product data management and corresponding systems and computer-readable mediums. A method includes receiving a three-dimensional CAD model in the data processing system, the CAD model including a plurality of geometries. The method includes identifying equivalence relationships between multiple ones of the geometries and receiving at least one Relationship Implication (RI) definition. Each RI definition defines a relationship implication according to a plurality of the geometries and at least one type of the equivalence relationships. The method includes applying each RI definition to the geometries to produce groups of geometries corresponding to each RI definition and selecting a representative geometry for each group. The method includes filtering out geometric relationships for each geometry in each group other than the representative geometry and manipulating the CAD model without the filtered-out geometric relationships.

20 Claims, 4 Drawing Sheets

(56) References Cited

OTHER PUBLICATIONS

Wolfgang Sohrt, et al., "Interaction with Constraints in 3D Modeling", SMA '91 Proceedings of the First ACM Symposium on Solid Modeling Foundations and CAD/CAM Applications, Jun. 5, 1991, p. 387-396.

Michael L. Gleicher, "A Differential Approach to Graphical Interaction", Jan. 1, 1994, p. 1-250.

C. Hsu, et al., "A Constraint-based Manipulator Toolset for Editing 3D Objects", Proceedings of the Fourth Symposium on Solid Modeling and Applications, May 14-16, 1997, p. 168-180.

Notification of Transmittal of the International Search Report and the Written Opinion of the International Searching Authority, or the Declaration dated Aug. 26, 2013 in connection with International Patent Application No. PCT/US2013/049206.

\* cited by examiner

IDENTIFICATION AND MANAGEMENT OF REDUNDANCY WITHIN GEOMETRIC RELATIONSHIPS

CROSS-REFERENCE TO OTHER APPLICATION

This application claims the benefit of the filing date of U.S. Provisional Patent Application 61/668,794, filed Jul. 6, 2012, which is hereby incorporated by reference. This application also shares subject matter in common with, but is otherwise unrelated to, concurrently filed U.S. patent application Ser. No. 13/627,143, filed Sep. 26, 2012, entitled "Integrating Discovered and User-Defined Geometric Relationships", which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include methods for product data management and corresponding systems and computer-readable mediums. A method includes receiving a three-dimensional CAD model in the data processing system, the CAD model including a plurality of geometries. The method includes identifying equivalence relationships between multiple ones of the geometries and receiving at least one Relationship Implication definition. Each RI definition defines a relationship implication according to a plurality of the geometries and at least one type of the equivalence relationships. The method includes applying each RI definition to the geometries to produce groups of geometries corresponding to each RI definition and selecting a representative geometry for each group. The method includes filtering out geometric relationships for each geometry in each group other than the representative geometry and manipulating the CAD model without the filtered-out geometric relationships.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

PDM systems can perform processes including processes that recognize a variety of geometric relationship between elements or features of an object mode. Such processes allow users to edit models while retaining important design features. Some such processes are described in commonly-assigned U.S. patent application Ser. Nos. 13/529,061 and 13/529,066, both filed Jun. 21, 2012, which are hereby incorporated by reference.

Given any three-dimensional (3D) CAD model or other PDM model there are many geometric relationships that the user may wish to keep when edits are made. In addition to the ability to discover these relationships, the disclosed system can also recognize that part of the discovered relationships may be implied by other data in the model. These implied relationships are redundant and therefore may be ignored in subsequent processing in order to simplify the user's view of the relationships in the system and improve efficiency. The systems and method described below include techniques directed to how these relationships may be efficiently discovered. The redundant geometric relationships can include distances, relative sizes, placements, directions, constraints, shell relationships, other user-defined geometric conditions, rigidity within a group of geometries, and other information that describes the geometric characteristics of multiple geometries.

Figure 1:
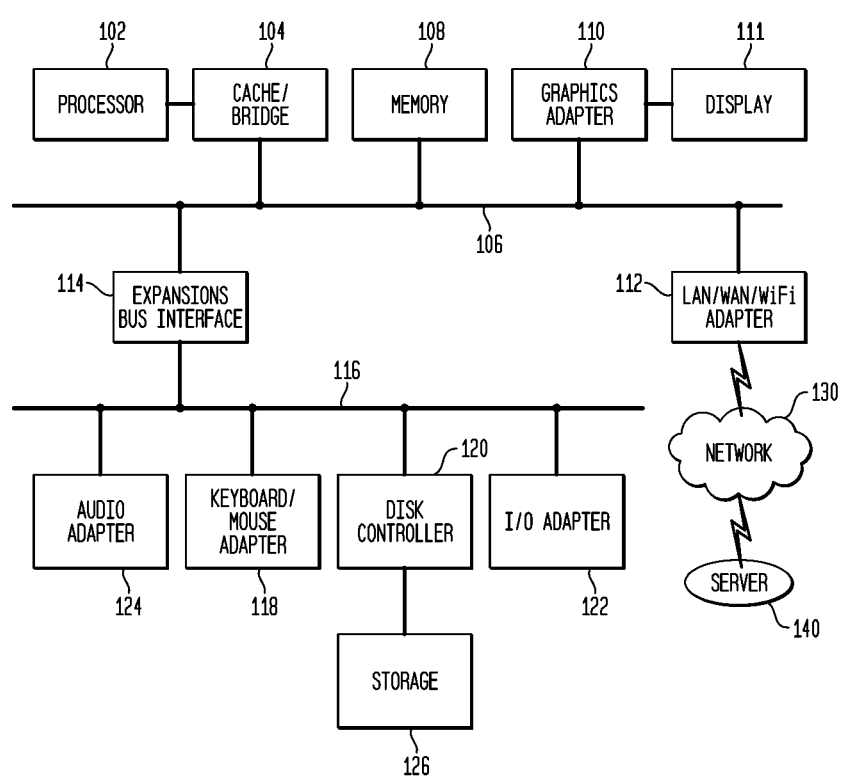
FIG. 1 depicts a block diagram of a data processing system in which an embodiment can be implemented.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

The discovery of geometric relationships using equivalence class based algorithms can produce a full yet efficient representation of all geometrically-true relationships in a CAD model. Meanwhile, it is often true that other pre-existing data in the model may imply some of these discovered relationships. If these implied relationships are not removed from the system, downstream operations can become over complex and not efficient.

Various disclosed embodiments can identify, manage, or remove redundant relationships in a CAD model. For example, various embodiments can filter out redundant relationships from the data presented to the user to ensure that the user is presented with a clear set of data to manipulate to get the desired edit behavior.

The system can also consider the persistent data on the model while filtering, and can present a natural set of relationships to interact with depending on the data. For example, in a thin-walled part, the system can recognize that the relationships to both sides of the thin-wall are not necessary and could confuse the user's view. The system can also recognize a pattern of occurrences and show relevant relationships only within one occurrence instead of all occurrences, thus allowing the user to ignore a relationship on one occurrence without the need to consider the same relationship on all other occurrences.

The system can also recognize relationships within a set of geometries known to be rigid, for example those that the user has selected, and hide those relationships. These relationships are not necessary and displaying them would clutter the display of information to the user.

Disclosed embodiments improve performance of downstream operations due to the reduced amount of data to process once redundant or otherwise unnecessary relationships are removed.

According to disclosed embodiments, a specialised filtering phase is used to identify the implied relationships and mark them as redundant. This filtering phase minimizes the amount of relationship data passed to subsequent processing phases, and improves efficiency, by detecting and removing redundancy in the discovered relationships.

Geometric relationships may be implied by other pre-existing data in the model, and such data is referred to herein as "Relationship Implications" or "RIs". Some examples include other features in the model, such as shell relationships, and other user-defined geometric conditions, such as rigidity within a group of geometries.

In addition, discovered geometric relationships, when combined with existing Relationship Implications, can also imply other geometric relationships. Typical scenarios include: geometric relationships discovered on one side of a shelled model will imply those found on the other side.

In a model with a face pattern, geometric relationships discovered in one occurrence in the pattern will imply the relationships that may be found in all other occurrences in the pattern.

A Relationship Implication defines whether certain types of relationships between a number of given geometries are implied. A number of Relationship Implications may be found on a given geometry. A typical Relationship Implication can be defined as:

RI(type)={{m1}, {m2}, {m3} . . . |Relationship Types}

This RI indicates that any relationships of 'Relationship Types' found between 'm1, m2, m3 . . . ' are redundant. Relationship types that can be applied include, but are not limited to, Identical (geometries share the same type and all components); Same Center (geometries share the same center component); Same Axis (geometries share the same axis component); Same Plane (geometries share the same plane component); Same Shape (geometries that share the same type, and same radius, major and minor radii, or half angle component); Same Direction (geometries share the same direction, aligned or anti-aligned), Symmetrical, and others. Other indicators can be used, such as "Alltypes", which refers to all relationship types.

The system can also define a more generic Relationship Implication to indicate certain types of relationships are redundant between groups of geometries but are desired within each of the groups:

RI(type)={{m1, m2, m3}, {m4, m5, m6}, {m7, m8, m9}|Relationship Types}

In this example, relationships are redundant between the groups {m1, m2, m3} and {m4, m5, m6}, but not between m1 and m2.

By defining Relationship Implications in terms of model-specific conditions, the system can then efficiently determine which of the discovered relationships are not required.

Given the members of a found relationship, the system can then perform the following processes to identify redundancy within the relationship.

The system can identify Relationship Implications on all the members that imply this type of relationship. This includes applying the Relationship Implication definitions to produce groups of geometries corresponding to each Relationship Implication definition; the Relationship Implication groups for each definition include those geometries that satisfy the definition between the geometries in the group. That is, the system can place the Relationship Implication results with common Relationship Implications in a common group.

The system can merge groups if necessary so that each member belongs to at most one group. That is, if one group with a common RI includes m1 and m2, and another group with the same common RI includes m2 and m3, then these groups can be merged into a single group {m1, m2, m3}, since they all have the same RI.

After the grouping, the system can select a representative member for each group. It will be sufficient to define the relationship using only the group representatives and non-grouped members; any other grouped members that are not representatives can be considered as redundant and ignored by subsequent processing stages. The selection can be arbitrary, or can be based on criteria such as location of the member in the model, number of subassemblies or components, size, or any other criteria.

Figure 2:
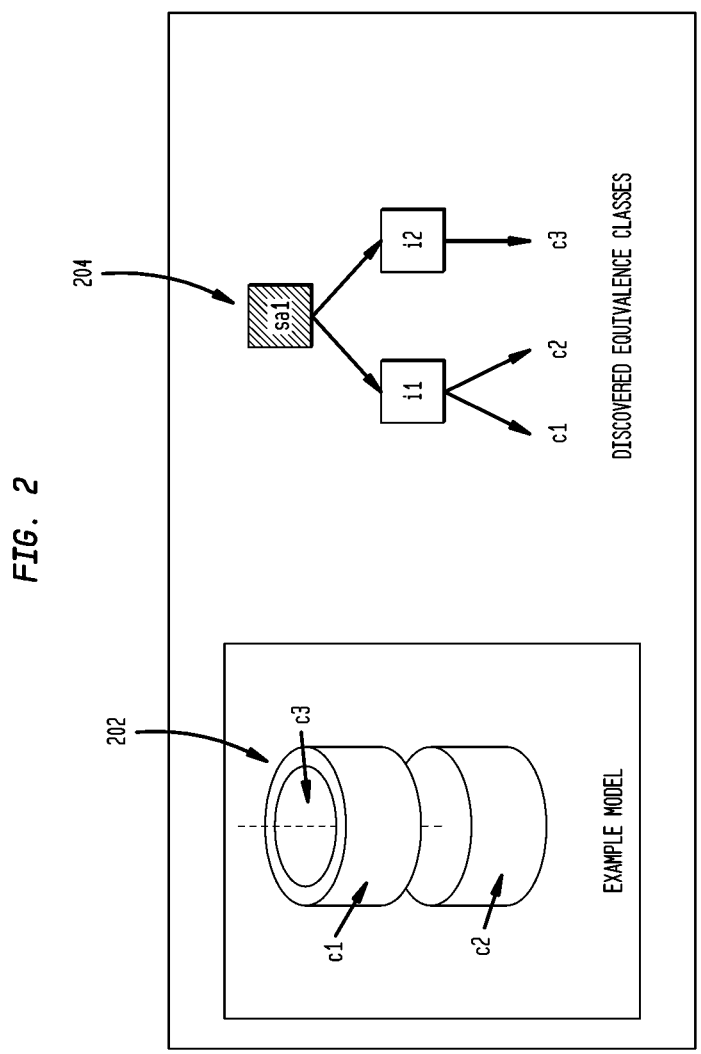
FIGS. 2 and 3 depict exemplary CAD models and corresponding relationship graphs, in accordance with disclosed embodiments.

FIG. 2 depicts an exemplary CAD model and corresponding relationship graph, in accordance with disclosed embodiments, and is used to demonstrate how this filtering process works.

In this example model 202, c1 and c3 are two sides of a cylindrical shell relation, whereas c1 and c2 are geometrically identical. Initially, a Same Axis class as shown in the figure will be found, represented as sa1 in the relationship graph 204 that shows the discovered equivalence classes.

This Same Axis class has two members, i1 and i2, where i1 is an Identical class containing c1 and c2, and i2 is an Identical class containing just c3, as shown in relationship graph 204.

The system identifies a Relationship Implication on i1 and i2 indicating any relationships found between c1 and c3 are redundant because they are implied by the shell Relationship Implication:

RI(Shell)={{c1}, {c3}|ALLTYPES}

Due to this RI, i1 and i2 will be placed in one group, which means sa1 is now redundant because all its members belong to one group.

Once a relationship has passed the above filtering process, and it still has more than two members that are not redundant, then it will qualify for the second phase of filtering, in which the system determines if the relationship itself would imply other relationships in the model.

If other relationships would be implied, a Relationship Implication will be created for the corresponding geometries between which the same type of relationship is implied by this relationship. When the relationship is later discovered between these geometries, this Relationship Implication will participate in the main filtering process described earlier, which will subsequently mark the second relationship as redundant.

Figure 3:
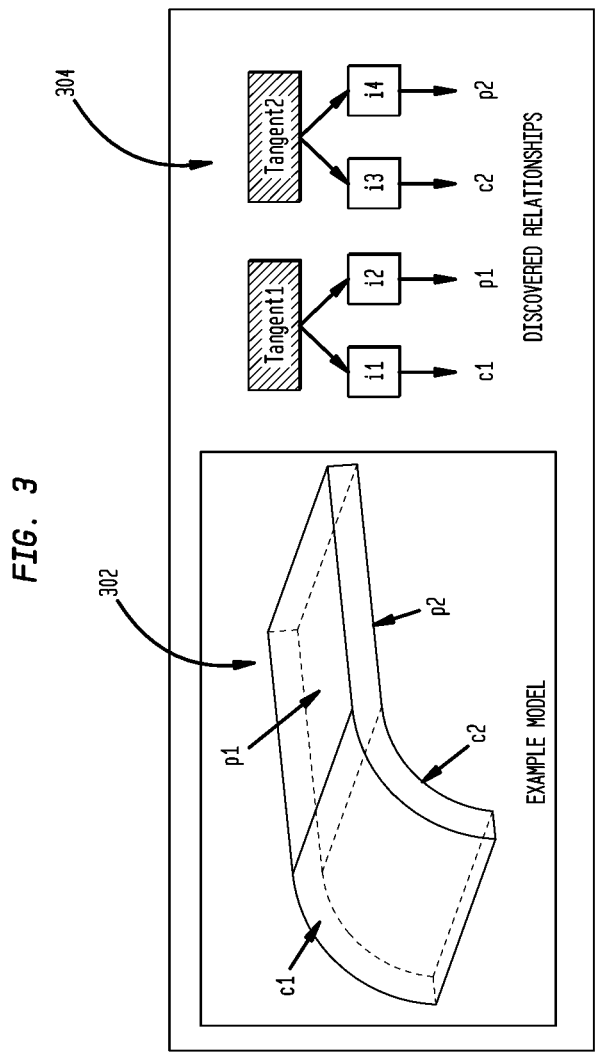

FIG. 3 depicts an exemplary CAD model and corresponding relationship graph, in accordance with disclosed embodiments, and is used to demonstrate how a relationship found on one side of a shelled model can be used to filter out the same type of relationship found between the corresponding faces on the other side of the model.

In this example model 302, c1 and c2, p1 and p2 are the partner faces in two shell relations, respectively.

The system first finds the tangent relationship between c1 and p1 and accepts this relationship as it is not implied by any other data. This relationship is depicted in relationship graph.

The system also creates a Relationship Implication that indicates the tangent relationship between c2 and p2 is redundant, because it is implied by the tangent relationship between c1 and p1:

RI(shell)={{c2}, {p2}|Tangent}

When the tangent relationship between c2 and p2 is discovered, the grouping process will place them in a single group due to this Relationship Implication, making this relationship redundant. This filtering phase ensures geometric relationships are only represented on one side of a shelled model.

The system can then store, display, or manipulate the CAD model without the filtered-out geometric relationships.

In some embodiments, the process described above for redundancy detection is only applied to geometric relationships discovered during the synchronous edit of a three-dimensional model. As the user can also define geometric relationships on the model before the synchronous edit is started, this method can be also be used with both discovered and user-defined geometric relationships, improving system efficiency by removing redundant relationships in the model.

In some embodiments, the system stores all the Relationship Implications once they are collected. In other embodiments, the system detects these Implications in real-time when the geometric relationships are being filtered.

In addition, the system can create one type of Relationship Implication for almost each type of implication objects, but in other cases the system combines different types of implication objects in one Relationship Implication.

The system can store the Relationship Implications on the members of Identical equivalence classes, for example as leaf nodes in the EC relationship graph. When the relationship Implications of a higher-level member is required, the system can traverse down to the leaf nodes and collect the Relationship Implications. In some embodiments, the system can instead store the Relationship Implications for all nodes in the EC relationship graph to avoid traversal, which may be expensive in some particular cases.

Figure 4:
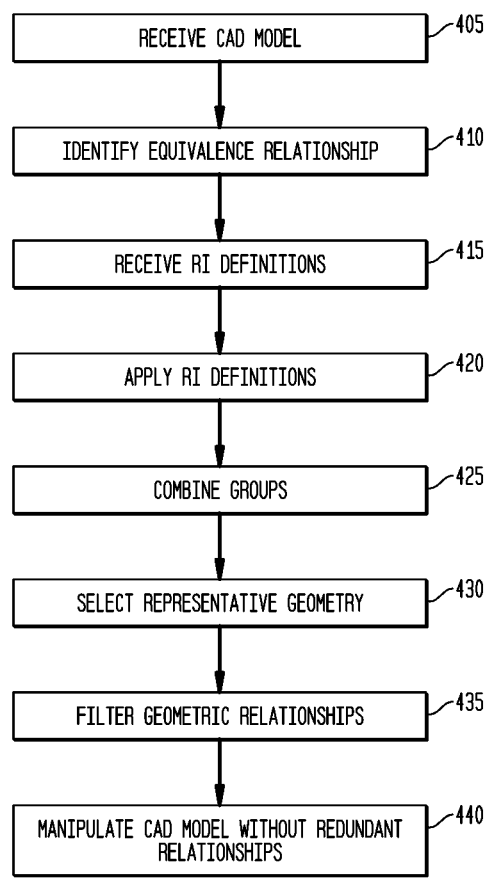
FIG. 4 depicts a flowchart of a process in accordance with disclosed embodiments.

FIG. 4 depicts a flowchart of a process in accordance with disclosed embodiments that may be performed, for example, by a PLM or PDM system.

The system receives a three-dimensional CAD model (Step 405). Receiving, as used herein, can include loading from storage, receiving from another device or process, receiving via an interaction with a user, or otherwise. The CAD model includes a plurality of geometries, including simple geometries such as edges, faces, curves, and complex geometries composed of multiple simple geometries, such as shells, walls, bosses, and others.

The system identifies geometric relationships between multiple ones of the geometries (step 410). In some embodiments, these geometric relationships are selected from equivalence relationship types including Identical, Same Center, Same Axis, Same Plane, Same Shape, Same Direction, and Symmetrical. This step can include storing the identified equivalence relationships in a relationship graph or other data structure.

The system receives at least one Relationship Implication (RI) definition (step 415). The RI definition defines a type of relationship implication according to a plurality of the geometries and at least one equivalence relationship type, including a plurality or combination of relationship types. The RI definitions define RIs for which geometric relationships are redundant; such redundant geometric relationships can be one or more of distances, relative sizes, placements, directions, constraints, shell relationships, other user-defined geometric conditions, rigidity within a group of geometries, and other information that describes the geometric characteristics of multiple geometries. The RI definition can include groups of the geometries for which the geometric relationships are redundant between the groups of geometries but not redundant between the geometries in each of the groups.

The system applies the RI definitions to the geometries to produce groups of geometries corresponding to each Relationship Implication definition (step 420).

If necessary, the system can combine the groups of geometries so that each geometry belongs to no more than one group for each RI definition (step 425).

The system selects a representative geometry for each group (step 430).

The system filters out the geometric relationships for each geometry in each group other than the representative geometry (step 435). The filtering can consider persistent data of the model while filtering, and can retain a natural set of relationships with which a user can work. The filtered-out relationships are the redundant relationships with respect to the representative geometry.

The system manipulates the CAD model without the filtered-out geometric relationships (step 440). This can include displaying the CAD model to a user without the filtered-out geometric relationships.

Of course, those of skill in the art will recognize that, unless specifically indicated or required by the sequence of operations, certain steps in the processes described above may be omitted, performed concurrently or sequentially, or performed in a different order. Any of the other features and processes described above can be included in the process of FIG. 4.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for product data management, the method performed by a data processing system and comprising:
   receiving a three-dimensional CAD model in the data processing system, the CAD model including a plurality of geometries;
   identifying equivalence relationships between multiple ones of the geometries;
   receiving at least one Relationship Implication (RI) definition, each RI definition defining a relationship implication according to a plurality of the geometries and at least one type of the equivalence relationships;
   applying each RI definition to the geometries to produce groups of geometries corresponding to each RI definition;
   selecting a representative geometry for each group;
   filtering out geometric relationships for each geometry in each group other than the representative geometry; and
   manipulating the CAD model without the filtered-out geometric relationships.

2. The method of claim 1, wherein the data processing system also combines at least two of the groups of geometries to that each geometry belongs to no more than one group for each corresponding RI definition.

3. The method of claim 1, wherein the filtering considers persistent data of the CAD model and retains a natural set of relationships with which a user can work.

4. The method of claim 1, wherein the data processing system also displays the CAD model to a user without the filtered-out geometric relationships.

5. The method of claim 1, wherein the filtered-out geometric relationships are redundant relationships with respect to the representative geometry.

6. The method of claim 1, wherein the geometric relationships are one or more of redundant geometric relationships can be one or more of distances, relative sizes, placements, directions, constraints, shell relationships, user-defined geometric conditions, rigidity within a group of geometries, and other information that describes the geometric characteristics of multiple geometries.

7. The method of claim 1, wherein at least one RI definition defines a relationship implication according to a plurality of the geometries and a combination of the types of the equivalence relationships.

8. A data processing system comprising:
a processor; and
an accessible memory, the data processing system particularly configured to
receive a three-dimensional CAD model in the data processing system, the CAD model including a plurality of geometries;
identify equivalence relationships between multiple ones of the geometries;
receive at least one Relationship Implication (RI) definition, each RI definition defining a relationship implication according to a plurality of the geometries and at least one type of the equivalence relationships;
apply each RI definition to the geometries to produce groups of geometries corresponding to each RI definition;
select a representative geometry for each group;
filter out geometric relationships for each geometry in each group other than the representative geometry; and
manipulate the CAD model without the filtered-out geometric relationships.

9. The data processing system of claim 8, wherein the data processing system also combines at least two of the groups of geometries to that each geometry belongs to no more than one group for each corresponding RI definition.

10. The data processing system of claim 8, wherein the filtering considers persistent data of the CAD model and retains a natural set of relationships with which a user can work.

11. The data processing system of claim 8, wherein the data processing system also displays the CAD model to a user without the filtered-out geometric relationships.

12. The data processing system of claim 8, wherein the filtered-out geometric relationships are redundant relationships with respect to the representative geometry.

13. The data processing system of claim 8, wherein the geometric relationships are one or more of redundant geometric relationships can be one or more of distances, relative sizes, placements, directions, constraints, shell relationships, user-defined geometric conditions, rigidity within a group of geometries, and other information that describes the geometric characteristics of multiple geometries.

14. The data processing system of claim 8, wherein at least one RI definition defines a relationship implication according to a plurality of the geometries and a combination of the types of the equivalence relationships.

15. A non-transitory computer-readable medium encoded with executable instructions that, when executed, cause one or more data processing systems to:
receive a three-dimensional CAD model in the data processing system, the CAD model including a plurality of geometries;
identify equivalence relationships between multiple ones of the geometries;
receive at least one Relationship Implication (RI) definition, each RI definition defining a relationship implication according to a plurality of the geometries and at least one type of the equivalence relationships;
apply each RI definition to the geometries to produce groups of geometries corresponding to each RI definition;
select a representative geometry for each group;
filter out geometric relationships for each geometry in each group other than the representative geometry; and
manipulate the CAD model without the filtered-out geometric relationships.

16. The computer-readable medium of claim 15, wherein the data processing system also combines at least two of the groups of geometries to that each geometry belongs to no more than one group for each corresponding RI definition.

17. The computer-readable medium of claim 15, wherein the filtering considers persistent data of the CAD model and retains a natural set of relationships with which a user can work.

18. The computer-readable medium of claim 15, wherein the data processing system also displays the CAD model to a user without the filtered-out geometric relationships.

19. The computer-readable medium of claim 15, wherein the filtered-out geometric relationships are redundant relationships with respect to the representative geometry.

20. The computer-readable medium of claim 15, wherein the geometric relationships are one or more of redundant geometric relationships can be one or more of distances, relative sizes, placements, directions, constraints, shell relationships, user-defined geometric conditions, rigidity within a group of geometries, and other information that describes the geometric characteristics of multiple geometries.

* * * * *